(12) United States Patent
Beckwith et al.

(10) Patent No.: US 11,565,883 B2
(45) Date of Patent: Jan. 31, 2023

(54) APPARATUS AND METHODS FOR SUPPORTING AN OBJECT

(71) Applicant: Corning Incorporated, Corning, NY (US)

(72) Inventors: Jared David Beckwith, Lancaster, KY (US); Matthew John Cempa, Tyrone, PA (US); Aziz Hoque, Painted Post, NY (US); Thomas Augustus Keebler, Corning, NY (US); Kenneth Spencer Morgan, Painted Post, NY (US); Kevin Lee Wasson, Elmira, NY (US); William Lawrence West, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 106 days.

(21) Appl. No.: 17/271,389

(22) PCT Filed: Aug. 23, 2019

(86) PCT No.: PCT/US2019/047835
§ 371 (c)(1),
(2) Date: Feb. 25, 2021

(87) PCT Pub. No.: WO2020/046729
PCT Pub. Date: Mar. 5, 2020

(65) Prior Publication Data
US 2021/0339959 A1 Nov. 4, 2021

Related U.S. Application Data

(60) Provisional application No. 62/724,174, filed on Aug. 29, 2018.

(51) Int. Cl.
*B65G 13/06* (2006.01)
*B65G 13/04* (2006.01)
(Continued)

(52) U.S. Cl.
CPC .......... *B65G 13/065* (2013.01); *B65G 13/04* (2013.01); *B65G 39/025* (2013.01);
(Continued)

(58) Field of Classification Search
CPC .................................................. B65G 13/065
(Continued)

(56) References Cited

U.S. PATENT DOCUMENTS 3,195,963 A * 7/1965 Anderson ........... F16C 32/0614
384/109
3,675,977 A * 7/1972 Arsenius ................. F16C 17/03
384/117
(Continued)

FOREIGN PATENT DOCUMENTS

CN 1077781 A * 10/1993 ............... F03G 7/06
CN 101020539 A 8/2007
(Continued)

OTHER PUBLICATIONS

Chinese Patent Application No. 201980061648.0, Office Action, dated May 23, 2022, 16 pages (9 pages of English Translation and 7 pages of Original Document), Chinese Patent Office.
(Continued)

*Primary Examiner* — Joseph A Dillon, Jr.
(74) *Attorney, Agent, or Firm* — Matthew J. Mason

(57) ABSTRACT

A support apparatus can comprise a cylindrical rod extending along a first rotation axis and comprising a first end portion provided with a first convex spherical segment and a second end portion provided with a second convex spherical segment. A first area can be configured to receive a portion of the first convex spherical segment. A second area can be configured to receive a portion of the second convex spherical segment. The cylindrical rod can be pivotable about a first pivot axis perpendicular to the first rotation axis.
(Continued)

In some embodiments, methods of supporting an object can comprise engaging a surface of the object with the outer surface of the cylindrical rod wherein the first cylindrical rod supports a weight of the object while the first cylindrical rod is supported by the first fluid cushion and the second fluid cushion.

25 Claims, 4 Drawing Sheets

(51) Int. Cl.
    *B65G 39/02*     (2006.01)
    *C03B 35/16*     (2006.01)
    *C03B 35/18*     (2006.01)

(52) U.S. Cl.
    CPC .......... *C03B 35/162* (2013.01); *C03B 35/165* (2013.01); *C03B 35/181* (2013.01)

(58) Field of Classification Search
    USPC .................................................... 193/35 MD
    See application file for complete search history.

(56) References Cited

U.S. PATENT DOCUMENTS

| | | | | |
|---|---|---|---|---|
| 3,713,799 | A * | 1/1973 | McMaster | C03B 29/12 65/273 |
| 3,732,445 | A * | 5/1973 | Laing | F04D 13/026 310/90 |
| 3,874,749 | A * | 4/1975 | Maniak | B65G 39/025 193/35 MD |
| 6,019,211 | A * | 2/2000 | Masciarelli, Jr. | B65G 13/12 198/346.2 |
| 6,024,266 | A | 2/2000 | Helinski et al. | |
| 6,279,717 | B1 * | 8/2001 | Chen | B65G 13/12 193/42 |
| 6,729,460 | B2 * | 5/2004 | Esser | B65G 13/12 193/35 TE |
| 7,370,746 | B2 * | 5/2008 | Iguchi | F16C 29/046 193/35 MD |
| 7,568,409 | B2 * | 8/2009 | Nicholl | B23Q 1/70 310/90.5 |
| 8,011,307 | B2 * | 9/2011 | Marcelli | F16C 29/046 108/55.3 |
| 8,052,326 | B2 * | 11/2011 | Pike | A61G 7/1034 384/49 |
| 8,529,131 | B2 * | 9/2013 | Deng | F16C 29/046 384/49 |
| 8,863,933 | B2 * | 10/2014 | Keto | C03B 35/24 65/106 |
| 8,864,436 | B2 * | 10/2014 | Deng | F16C 27/04 384/49 |
| 8,960,401 | B2 * | 2/2015 | Parsons | B60P 1/52 198/782 |
| 9,429,208 | B2 | 8/2016 | Cui et al. | |
| 9,499,341 | B2 * | 11/2016 | Wilkins | B65G 39/025 |
| 11,420,895 | B2 * | 8/2022 | Fournel | C03B 35/18 |
| 2001/0037929 | A1 | 11/2001 | Bond et al. | |
| 2006/0042314 | A1 * | 3/2006 | Abbott, III | C03B 17/06 65/195 |
| 2012/0049679 | A1 * | 3/2012 | Petrenko | F16C 17/10 310/90 |
| 2012/0167626 | A1 * | 7/2012 | Lee | C03B 29/08 65/182.2 |
| 2014/0291125 | A1 * | 10/2014 | Li | B65G 39/06 198/780 |
| 2018/0245635 | A1 * | 8/2018 | Platzek | F16C 32/0685 |
| 2019/0194055 | A1 * | 6/2019 | Mori | B65H 1/00 |
| 2020/0024077 | A1 * | 1/2020 | Aschpurwis | B65G 39/07 |

FOREIGN PATENT DOCUMENTS

| | | | |
|---|---|---|---|
| CN | 201068343 Y | 6/2008 | |
| CN | 105151803 A | 12/2015 | |
| CN | 107340618 A | 11/2017 | |
| CN | 109955097 B * | 9/2020 | ............ B23Q 5/043 |
| DE | 19528623 A1 * | 2/1997 | ............ D01H 4/12 |
| JP | 2015-024942 A | 2/2015 | |
| KR | 10-2005-0095181 A | 9/2005 | |
| KR | 20050095181 A * | 9/2005 | |
| KR | 10-0706182 B1 | 4/2007 | |
| KR | 100706182 B1 * | 4/2007 | |
| KR | 10-0927998 B1 | 11/2009 | |

OTHER PUBLICATIONS

International Search Report and Written Opinion of the International Searching Authority; PCT/US2019/047835 dated Dec. 4, 2019, 11 pages; European Patent Office.

Taiwanese Patent Application No. 108130377, Office Action dated Nov. 11, 2022, 3 pages (English Translation Only); Taiwanese Patent Office.

* cited by examiner

APPARATUS AND METHODS FOR SUPPORTING AN OBJECT

CROSS-REFERENCE TO RELATED APPLICATIONS

This application is a National Stage application under 35 U.S.C. § 371 of International Application No. PCT/US2019/047835, filed on Aug. 23, 2019, which claims the benefit of priority to U.S. Provisional Application Ser. No. 62/724,174 filed on Aug. 29, 2018, the content of both of which is relied upon and incorporated herein by reference in its entirety.

The present disclosure relates generally to apparatus and methods for supporting an object and, more particularly, to apparatus and methods for supporting a weight of an object.

BACKGROUND

Glass ribbons often are transported from one location to another. In some embodiments, pressure can be provided against a major surface of the glass ribbon to help support the weight of the glass ribbon during conveyance. For example, it is known to support the glass ribbon on a cushion of air that contacts the glass ribbon to levitate the glass ribbon on the cushion of air.

SUMMARY

The following presents a simplified summary of the disclosure to provide a basic understanding of some embodiments described in the detailed description.

In some embodiments, a support apparatus can comprise a first cylindrical rod comprising a first end portion and a second end portion, wherein the first cylindrical rod extends along a first rotation axis from the first end portion to the second end portion of the first cylindrical rod. The first end portion can be provided with a first convex spherical segment and a second end portion can be provided with a second convex spherical segment. The support apparatus can further comprise a first area configured to receive a portion of the first convex spherical segment with the first cylindrical rod pivotable about a first pivot axis of the first convex spherical segment that is perpendicular to the first rotation axis of the cylindrical rod. A first fluid port can be in fluid communication with the first area. The support apparatus can further comprise a second area configured to receive a portion of the second convex spherical segment with the first cylindrical rod pivotable about a first pivot axis of the second convex spherical segment that is perpendicular to the first rotation axis of the cylindrical rod and parallel to the first pivot axis of the first convex spherical segment. A second fluid port can be in fluid communication with the second area.

In some embodiments, the first area of the support apparatus can be configured to receive the portion of the first convex spherical segment with the first cylindrical rod pivotable about a second pivot axis of the first convex spherical segment that is perpendicular to the first rotation axis of the cylindrical rod and to the first pivot axis of the first convex spherical segment. The second area of the support apparatus can be configured to receive the portion of the second convex spherical segment with the first cylindrical rod pivotable about a second pivot axis of the second convex spherical segment that is parallel to the second pivot axis of the first convex spherical segment and perpendicular to the first rotation axis of the cylindrical rod and to the first pivot axis of the second convex spherical segment.

In some embodiments, the first area of the support apparatus can be configured to receive the portion of the first convex spherical segment with the first cylindrical rod pivotable by from about 10° to about 30° about the second pivot axis of the first convex spherical segment. The second area of the support apparatus can be configured to receive the portion of the second convex spherical segment with the first cylindrical rod pivotable from about 10° to about 30° about the second pivot axis of the second convex spherical segment.

In some embodiments, the first spherical segment can be configured to be freely supported by the first area. The second spherical segment can be configured to be freely supported by the second area.

In some embodiments, the first area of the support apparatus can be configured to receive the portion of the first convex spherical segment with the first cylindrical rod pivotable by from about 10° to about 30° about the first pivot axis of the first convex spherical segment. The second area of the support apparatus can be configured to receive the portion of the second convex spherical segment with the first cylindrical rod pivotable by from about 10° to about 30° about the first pivot axis of the second convex spherical segment.

In some embodiments, the first area of the support apparatus can be configured to receive the portion of the first convex spherical segment with the first cylindrical rod pivotable by 360° about the first pivot axis of the first convex spherical segment. The second area of the support apparatus can be configured to receive the portion of the second convex spherical segment with the first cylindrical rod pivotable by 360° about the first pivot axis of the second convex spherical segment.

In some embodiments, the support apparatus may comprise a joint configured to adjustably mount the first area relative to a support surface in a direction of the first rotation axis of the first cylindrical rod.

In some embodiments, the support apparatus may comprise a first lip circumscribing the first area and a second lip circumscribing the second area.

In some embodiments, the support apparatus may comprise the first area recessed below the first lip at a maximum depth within a range from about 20% to about 80% of a first radius of a first convex spherical segment. Also, the second area can be recessed below the second lip at a maximum depth within a range from about 20% to about 80% of a second radius of the second convex spherical segment.

In some embodiments, the support apparatus may comprise a cylindrical rod comprising one or more materials selected from the group consisting of: alumina, fused quartz, mullite, silicon carbide, and graphite.

In some embodiments, the support apparatus can comprise the first area defined by a first concave segment.

In some embodiments, the support apparatus can comprise the first concave segment comprising a first concave spherical segment.

In some embodiments, the support apparatus can comprise the second area defined by a second concave segment.

In some embodiments, the support apparatus can comprise the second concave comprising a second concave spherical segment.

In some embodiments, the support apparatus may comprise a second cylindrical rod.

In some embodiments, the support apparatus may comprise a first rotation axis of the first cylindrical rod parallel to a second rotation axis of the second cylindrical rod.

In some embodiments, the support apparatus may comprise a first rotation axis of the first cylindrical rod that extends at an acute angle relative to a second rotation axis of the second cylindrical rod.

In some embodiments, the first rotation axis and the second rotation axis do not extend along a common plane.

In some embodiments, the first rotation axis and the second rotation axis extend along a common plane.

In accordance with some embodiments, a method may comprise supporting an object with the support apparatus of any one of the support apparatus discussed above. Methods may comprise passing a first fluid stream through the first fluid port to form a first fluid cushion that can levitate the first convex spherical segment. Also, methods can comprise passing a second fluid stream through the second fluid port to form a second fluid cushion that can levitate the second convex spherical segment. Additionally, methods can include engaging a surface of the object with an outer surface of the first cylindrical rod, where the first cylindrical rod can support a weight of the object while the first cylindrical rod is supported by the first fluid cushion and the second fluid cushion.

In some embodiments, methods can further comprise traversing the object along a travel direction, wherein the object drives the first cylindrical rod to rotate while the first cylindrical rod is supported by the first fluid cushion and the second fluid cushion.

In some embodiments, methods can be used to support an object comprising a glass ribbon.

In some embodiments, methods can be used to support an object comprising a temperature within a range from about 500° C. to about 1200° C.

In some embodiments, methods can freely support the first spherical segment by the first area. The second spherical segment can freely support the second area. At the same time, the first cylindrical rod can support the object.

In some embodiments, methods can further comprise adjusting a distance between the first area and the second area while the first cylindrical rod supports the object.

BRIEF DESCRIPTION OF THE DRAWINGS

These and other features, aspects and advantages are better understood when the following detailed description is read with reference to the accompanying drawings, in which.

DETAILED DESCRIPTION

Figure 1:
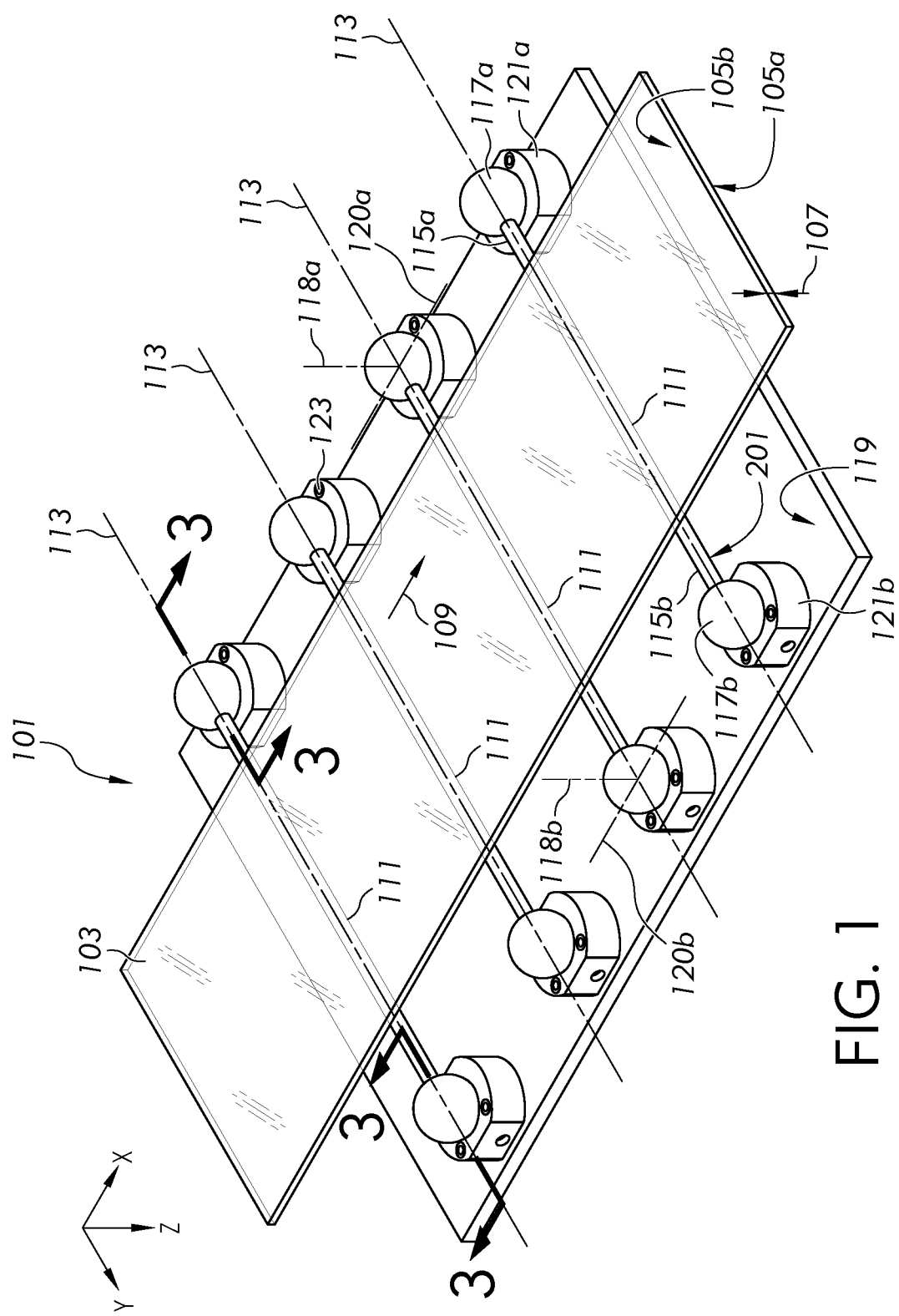
FIG. 1 illustrates a perspective view of some embodiments of the support apparatus supporting an object according to embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

It is to be understood that specific embodiments disclosed herein are intended to be exemplary and therefore non-limiting. For purposes of the disclosure, although not required, the support apparatus or method of supporting an object can be used in a glass manufacturing apparatus. Such a glass manufacturing apparatus can optionally comprise a glass forming apparatus that forms a glass sheet and/or glass ribbon from a quantity of molten material. For example, the glass manufacturing apparatus can optionally include a glass forming apparatus such as a slot draw apparatus, float bath apparatus, down-draw apparatus, up-draw apparatus, press-rolling apparatus or other glass forming apparatus. Furthermore, for purposes of the disclosure, although not required, such a glass manufacturing apparatus can include a storage device for storing a previous-formed glass ribbon. For example, although not shown, the glass manufacturing apparatus may optionally include a storage spool including a length of the glass ribbon wound on the storage spool. In some embodiments, the apparatus can support glass ribbon as it is formed with the glass manufacturing apparatus while the glass ribbon has a temperature greater than room temperature. In alternative embodiments, the apparatus can be used to support glass ribbon that has cooled to room temperature. In further embodiments, apparatus of the disclosure can support glass ribbon in the form of a glass sheet. For purposes of the disclosure, reference to a glass ribbon refers to glass ribbon that is being drawn from a glass manufacturing apparatus, glass ribbon that is be uncoiled from a storage spool of glass ribbon, and/or glass sheets separated from a larger length of glass ribbon.

Alternatively, the support apparatus or method of supporting an object can be used in a silicon wafer manufacturing apparatus or during conveyance of silicon wafers produced by a silicon wafer manufacturing apparatus. Embodiments of a silicon wafer manufacturing apparatus that can incorporate aspects of the disclosure can optionally comprise an ingot growth apparatus, a slicing apparatus, a lapping apparatus, and/or a cleaning apparatus.

FIG. 1 illustrates an elevational view of embodiments of the support apparatus 101 for supporting an object. The object can comprise a sheet of material (e.g., glass ribbon, silicon wafer) or other objects including a surface that may be engaged by the support apparatus 101 as discussed more fully below. In the illustrated embodiment, the object comprises a glass ribbon 103 in the form of a glass sheet although the object may comprise a glass ribbon prior to separating into a sheet of glass ribbon 103. For example, the glass ribbon 103 can be drawn from a spool of glass ribbon or drawn from a forming apparatus that forms molten material into the glass ribbon. The support apparatus 101 may engage a surface of the object when the support apparatus 101 is supporting the object to support at least a portion of a weight of the object. For instance, as shown in FIG. 1, the glass ribbon 103 may include a first major surface 105a and a second major surface 105b with a thickness 107 defined between the first major surface 105a and the second major surface 105b of the glass ribbon 103. As shown, the support apparatus 101 can engage (e.g., physically contact) the first major surface 105a of the glass ribbon 103 to support at least a portion of the weight of the glass ribbon 103. In some embodiments, as shown, the support apparatus 101 can engage the first major surface 105a of the glass ribbon 103 to support at least a portion of the weight of the glass ribbon 103 while the glass ribbon 103 travels along travel direction 109 relative to the support apparatus 101. In the illustrated embodiment, the travel direction 109 can extend horizontally along illustrated directional coordinate "x" that is perpendicular to gravity along illustrated directional coordinate "z". In some embodiments, the travel direction 109 may have an elevational incline, where the travel direction 109 includes a directional component opposite the direction of gravity. Alternatively, the travel direction 109 may have an elevational decline where the travel direction 109 includes a directional component in the direction of gravity. In some embodiments, the travel direction 109 may elevationally alternate between one or more of a horizontal travel path, an elevationally inclined path, and/or an elevationally declined path. Furthermore, in any of the embodiments, the glass ribbon 103 may tilt in one or more directions about the travel direction illustrated as the directional coordinate "x". Such tilting, for example, is illustrated in phantom lines in FIG. 4.

FIG. 1 illustrates a perspective view of the support apparatus 101 of embodiments of the present disclosure. As shown, the support apparatus 101 can comprise one or more cylindrical rods 111. The illustrated embodiments feature four cylindrical rods 111 although further embodiments may include one, two, three or more than four cylindrical rods 111. Furthermore, as shown, in some embodiments, each cylindrical rod 111 may be identical to one another, although different cylindrical rod designs may be provided in further embodiments.

Figure 4:
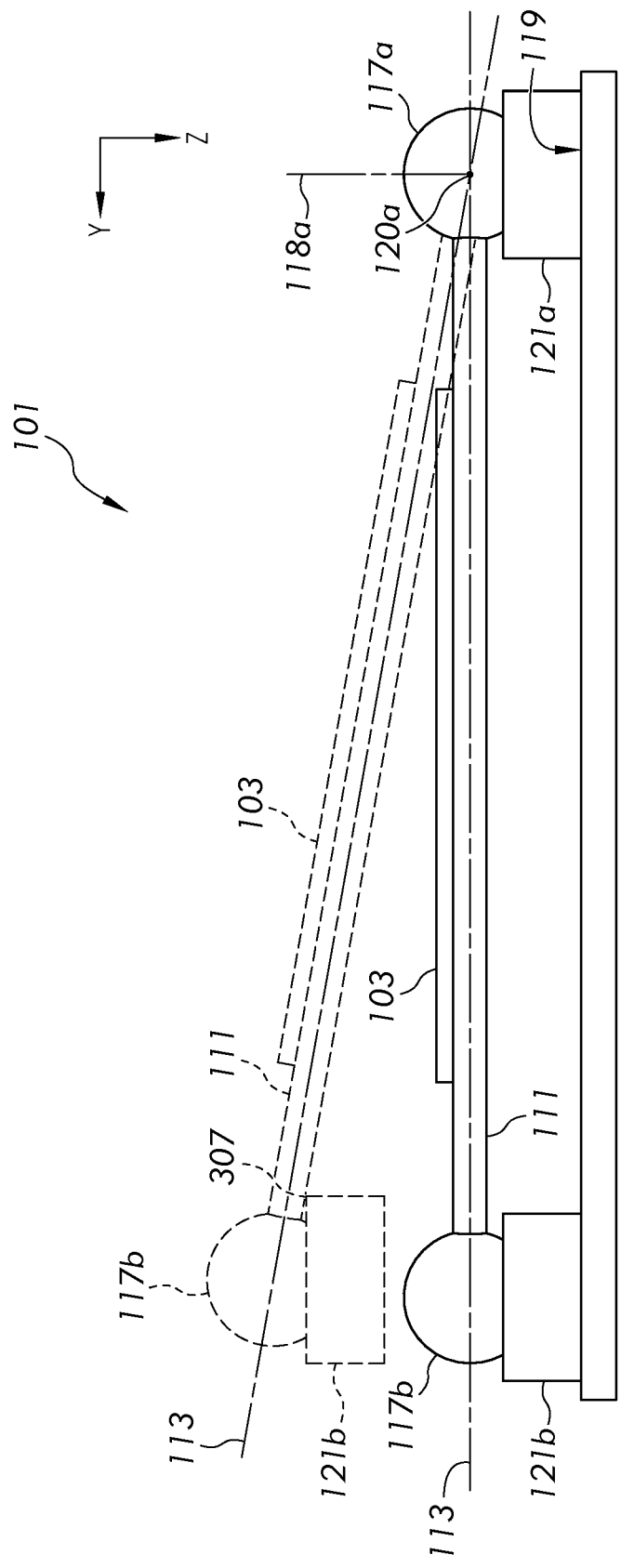
FIG. 4 is another elevational front-end view of the support apparatus of FIG. 1.
Figure 5:
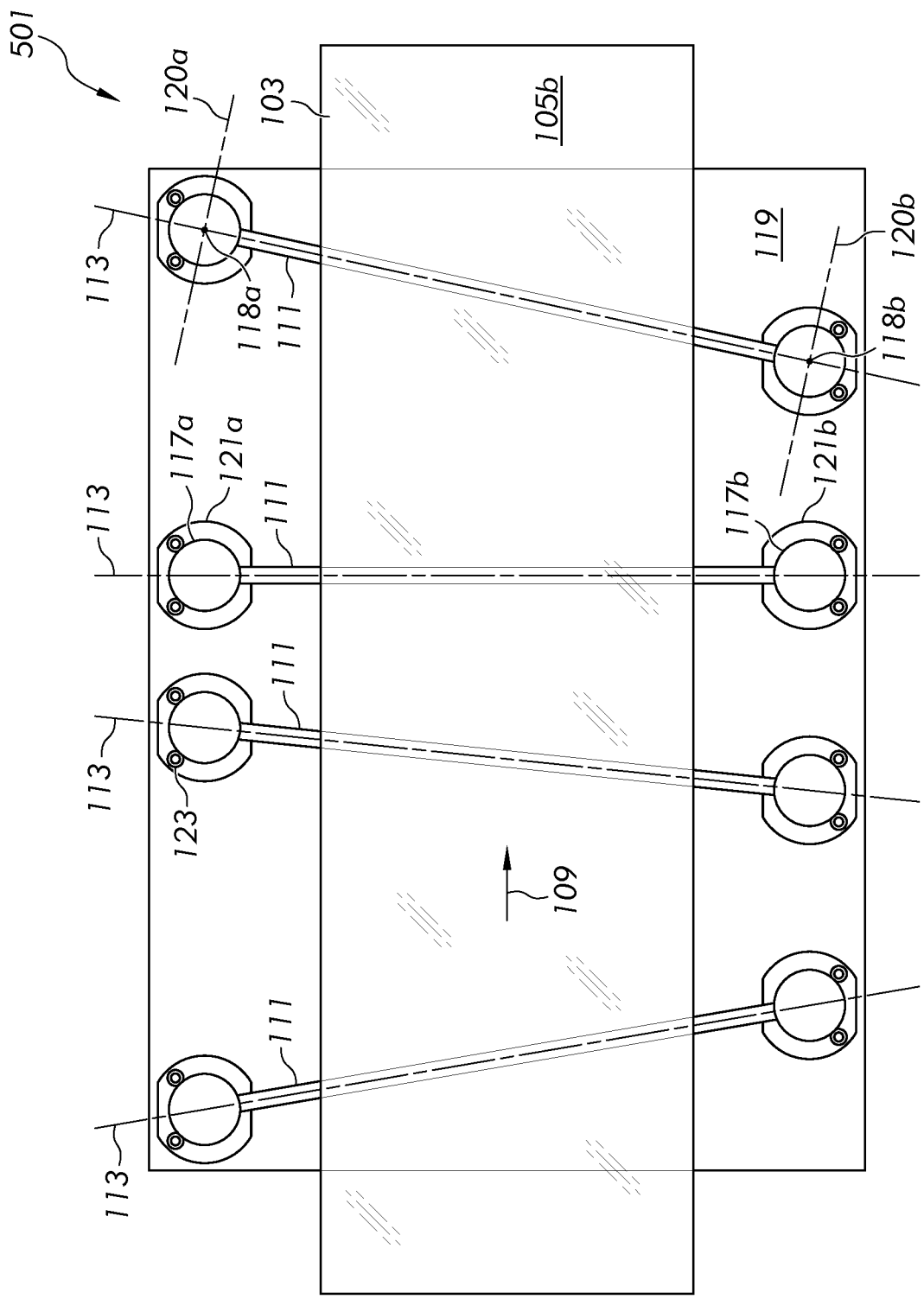
FIG. 5 illustrates a top plan view of an alternative embodiments of the support apparatus of FIG. 1.

In some embodiments, each cylindrical rod 111 can extend along a rotation axis 113 from a first end portion 115a to a second end portion 115b of the cylindrical rod 111. As shown, the rotation axis 113 can comprise a linear rotation axis extending through a symmetrical center of the cylindrical rod 111. In some embodiments, the rotation axis 113 of one or more of a plurality of cylindrical rods 111 may be parallel to the rotation axis 113 one or more other cylindrical rods 111 of the plurality of cylindrical rods 111. For instance, with reference to FIG. 1, the rotation axis 113 of all of the cylindrical rods 111 of the plurality of cylindrical rods 111 can extend parallel with respect to one another in a horizontal direction in the directional coordinate "y". Alternatively, in some embodiments, the rotation axis 113 of one or more of the cylindrical rods 111 can be positioned to extend at an acute angle with respect to the rotation axis 113 of one or more other cylindrical rods 111 of a plurality of cylindrical rods 111. For instance, with reference to the top plan view of the alternative embodiments of the support apparatus 501 shown in FIG. 5, each rotation axis 113 of each cylindrical rod 111 can extend at an acute angle with respect to each of the other cylindrical rods 111 although the rotational axis 113 of one cylindrical rod 111 may be parallel to the rotational axis 113 of one or more other cylindrical rods 111 in further embodiments. The elevational end view of FIGS. 2 and 4 can be representative of the support apparatus 101 shown in FIG. 1 and/or the support apparatus 501 of FIG. 5. Thus, as represented by FIGS. 2 and 4, in some embodiments, the rotation axis 113 of the cylindrical rods 111 can optionally extend along a common plane regardless of whether the rotation axis 113 of the cylindrical rods 111 are parallel to one another (as shown in FIG. 1) or angled relative to one another (as shown in FIG. 5).

In some embodiments, a rotation axis 113 of one of the cylindrical rods 111 does not extend along a common plane with a rotation axis 113 of another of the cylindrical rods 111. For instance, with reference to FIG. 4, the rotation axis 113 of the cylindrical rod 111 shown in phantom lines and the rotation axis 113 of the cylindrical rod 111 shown in solid lines extend at an acute angle relative to one another and do not extend along a common plane with the rotation axis 113 of the cylindrical rod 111.

Figure 2:
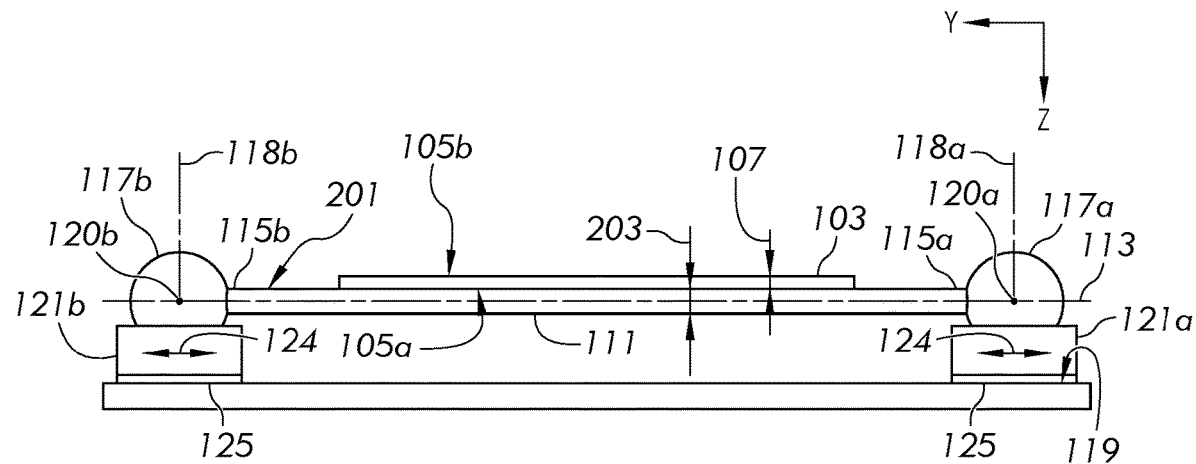
FIG. 2 illustrates an elevational front-end view of the support apparatus of FIG. 1.

As shown in FIG. 2, one or all of the cylindrical rods 111 may include an outer peripheral surface 201. As shown, the outer peripheral surface can include the same diameter 203 across a central portion of the cylindrical rods 111 between the first end portion 115a and the second end portion 115b of the cylindrical rod 111. As such, in some embodiments, the outer peripheral surface 201 may comprise a circular cylindrical surface as shown in FIGS. 1-5. Although not shown, the outer peripheral surface 201 may have shapes other than a circular cylindrical surface with the same diameter 203 across the central portion of the cylindrical rod. For instance, the outer peripheral surface may include a shape that matches a curvature of the glass ribbon 103 being supported by the support apparatus 101. In further embodiments, the outer peripheral surface 201 may be designed to facilitate alignment of the glass ribbon 103 during conveyance of the glass ribbon 103. For instance, in some embodiments, a middle portion of the central portion of the cylindrical rod 111 may have a reduced diameter that increases in each direction toward the first end portion 115a and the second end portion 115b. In such embodiments, the outer peripheral surface 201 flares outwardly toward the first and second end portions 115a, 115b. Such embodiments can be helpful to conform to the shape of a bowed glass ribbon 103. Furthermore, the glass ribbon 103 may be flexible in which case the glass ribbon 103 may temporarily bend into the bowed configuration to help align the glass ribbon 103 so that the glass ribbon 103 will tend to track to the middle of the central portion of the cylindrical rod 111 in proper alignment during conveyance. In further embodiments, the diameter 203 of the cylindrical rod 111 can change continuously or even non-continuously across its length. In further embodiments, the cylindrical rod 111 can comprise a different diameter in the region where it contacts the object (e.g., glass ribbon 103) being supported than it has elsewhere.

In some embodiments, the cylindrical rod 111 may be made of a material that has a high melting point, a low thermal conductivity, a low coefficient of thermal expansion, and a moderate coefficient of static friction. The cylindrical rod 111 can be designed to maintain its mechanical properties at the temperature of the object (e.g., glass ribbon 103) that is being supported, which can be considered the operating temperature of support apparatus 101. In some embodiments, the object may be freshly drawn glass ribbon 103. In such embodiments, the cylindrical rod 111 can be made of a material that has a melting temperature above 1600° C. If the cylindrical rod 111 comprises an amorphous material, the operating temperature can be below the glass transition temperature of that material. In some embodiments, the temperature of the object (e.g., glass ribbon 103) being supported can be within a range from about −50° C. to about 1200° C. or from about 500° C. to about 1200° C.

Also, the cylindrical rod 111 may be made of a material that has a low thermal conductivity. In such embodiments, the cylindrical rod 111 may not act as a significant heat sink and/or may not significantly impact any heating or cooling operations that can be performed on the object (e.g., glass ribbon 103) being supported. In some embodiments, the object can be cooled quickly while in other embodiments, the object can be held in a given temperature range in order to anneal it. For such embodiments, the material may comprise a thermal conductivity about 30 W m$^{-1}$ K$^{-1}$ or less, from about 0.01 W m$^{-1}$ K$^{-1}$ to about 50 W m$^{-1}$ K$^{-1}$, or from about 0.25 W m$^{-1}$ K$^{-1}$ to about 30 W m$^{-1}$ K$^{-1}$. In other embodiments, higher thermal conductivities may be permissible.

Additionally, the cylindrical rod 111 can be made a material that has a low coefficient of thermal expansion. While not necessary, a low coefficient of thermal expansion can allow relatively consistent dimensional stability of the cylindrical rod 111 even if the cylindrical rod 111 experiences thermal inhomogeneities across its length. For example, in some embodiments, a specific thermal profile may be imposed on the object being supported in order to obtain a target internal tension or compressive stress profile. Further, cylindrical rod 111 may not deform or warp under such conditions. For embodiments where a low coefficient of thermal expansion is desirable, the material may comprise a coefficient of thermal expansion about $10\times10$ $K^{-1}$ or less, from about $0.15\times10^{-6}$ $K^{-1}$ to about $30\times10^{-6}$ $K^{-1}$, or from about $3\times10^{-6}$ $K^{-1}$ to about $20\times10^{-6}$ $K^{-1}$.

In some embodiments, the cylindrical rod 111 may be made a material with a moderate coefficient of static friction for embodiments where the supported object (e.g., glass ribbon 103) is being traversed. The cylindrical rod 111 can rotate about the rotation axis 113 while the object translates relative to a support surface 119 without resisting the movement of the object as long as the force transmitted to the cylindrical rod 111 in the object's travel direction 109 is less than the product of a normal force generated by the weight of the object that is transmitted to the cylindrical rod 111 and the coefficient of static friction between the object and the cylindrical rod 111. In some embodiments, the cylindrical rod 111 may comprise a hollow tube to provide a cylindrical rod 111 with less mass and a correspondingly lower moment of inertia in order to minimized resistance to rotation of the cylindrical rod 111 upon engagement with the object. As such, sliding of the object (e.g. glass ribbon 103) relative to outer peripheral surface 201 of the cylindrical rod 111 can be avoided, thereby avoiding wear of the cylindrical rod 111 and/or damage to the first major surface 105a of the glass ribbon 103. In some embodiments, the cylindrical rod 111 may not be provided with an excessively low coefficient of static friction in order to prevent sliding of the outer peripheral surface 201 of the cylindrical rod 111 relative to the supported surface of the object. In some embodiments, the material of the cylindrical rod 111 may comprise a coefficient of static friction within a range from about 0.3 to about 1.0, from about 0.2 to about 1.5, or from about 0.35 to about 0.75.

In some embodiments, the cylindrical rod 111 may comprise alumina. In other embodiments, the cylindrical rod 111 may comprise fused quartz. In yet other embodiments, the cylindrical rod 111 may comprise mullite, which is a mineral comprising a combination of aluminum oxide and silicon dioxide. In still other embodiments, the cylindrical rod 111 may comprise silicon carbide, SiC. In some embodiments, the cylindrical rod 111 may comprise graphite. In further embodiments, the cylindrical rod 111 may comprise a combination of two or more of materials selected from the group of alumina, fused quartz, mullite, and silicon carbide.

As further shown in FIGS. 1-5, embodiments of the support apparatus 101, 501 may provide each cylindrical rod 111 with a first convex spherical segment 117a at the first end portion 115a of the cylindrical rod 111 and a second convex spherical segment 117b at the second end portion 115b of the cylindrical rod 111. Throughout the disclosure, a convex spherical segment can comprise a property that any two points in a portion bounded by an outer convex surface of the convex spherical segment can be connected by a line that does not cross the outer surface of the convex spherical segment. For instance, the convex spherical segments 117a, 117b are bounded by an outer convex surface 319 (see FIG. 3) of the convex spherical segments 117a, 117b. As further shown in FIG. 3, the convex spherical segments 117a, 117b may be substantially solid although hollow convex spherical segments may be provided in further embodiments.

Figure 3:
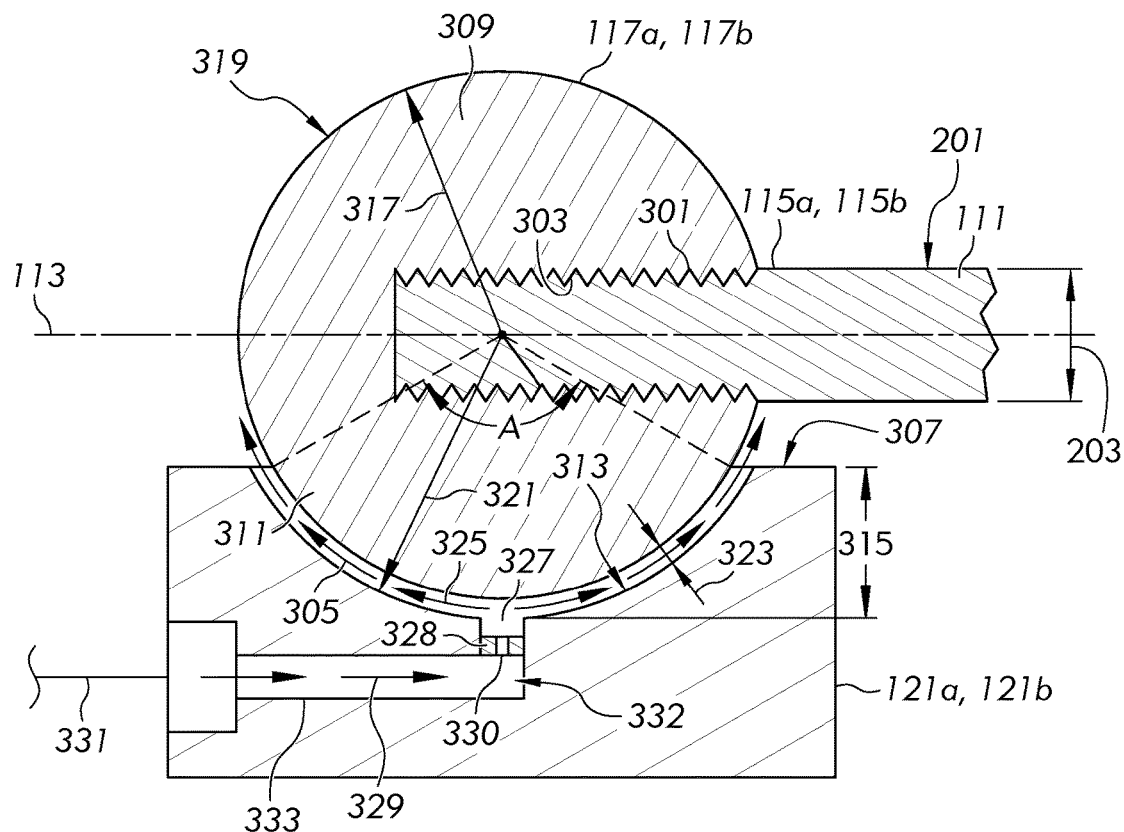
FIG. 3 is a cross-sectional view of the support apparatus taken along lines line 3-3 in FIG. 1.

In some embodiments, the first convex spherical segment 117a and/or the second convex spherical segment 117b may be attached to the corresponding first and second end portions 115a, 115b. For instance, as shown in FIG. 3, the first and second end portions 115a, 115b may each be provided with an exterior threaded portion 301 that can be threadedly received within an internally threaded bore 303 of the first and second convex spherical segments 117a, 117b. In some embodiments, the threaded connection may permit for removal of the first and second convex spherical segments 117a, 117b from the corresponding first and second end portions 115a, 115b of the cylindrical rod 111. In further embodiments, the threaded connection may comprise a permanent connection, for example where the threaded connections are press fit with respect to one another. In further embodiments, an adhesive may be used to facilitate connection. In further embodiments, a threaded connection may not be provided. For instance, the first and second end portions 115a, 115b may be press fit within a bore of the convex spherical segments 117a, 117b without a threaded connection. In still further embodiments, the convex spherical segments 117a, 117b may be integrally formed with the cylindrical rod 111. For example, a monolithic body of material may be machined (e.g., turned on a lathe) to form the cylindrical rod 111 and the convex spherical segments 117a, 117b from the same monolithic body. In additional further embodiments, the first and second convex spherical segments 117a, 117b may be welded to the corresponding end portions 115a, 115b of the cylindrical rod 111.

In some embodiments, the first and second convex spherical segments 117a, 117b may be solid with a bore (e.g., internally threaded bore 303) although the first and second convex spherical segments may comprise a hollow body in further embodiments. Providing the spherical segments as a hollow body can reduce the force to rotate the cylindrical rod 111 in use and therefore avoid unintended slipping between the outer peripheral surface 201 of the cylindrical rod 111 and the supported surface of the object (e.g., first major surface 105a of the glass ribbon 103). In some embodiments, the convex spherical segments 117a, 117b may comprise the same composition as the cylindrical rod 111. In other embodiments, the convex spherical segments 117a, 117b may comprise one or combination of the exemplary materials discussed above for the cylindrical rod 111. In yet other embodiments, the convex spherical segments 117a, 117b can comprise material with a coefficient of thermal expansion that has a difference from the coefficient of thermal expansion for the material of the cylindrical rod 111 of about $10\times10^{-6}$ $K^{-1}$ or less, about $5\times10^{-6}$ $K^{-1}$ or less, or about $1\times10^{-6}$ $K^{-1}$ or less.

The first convex spherical segment 117a and the second convex spherical segment 117b can be configured to reduce frictional resistance to a rotational motion of the associated cylindrical rod 111 about the rotation axis 113. As such, slipping between the outer peripheral surface 201 of the cylindrical rod 111 and the supported surface of the object (e.g., the supported first major surface 105a of the glass ribbon 103) can be reduced to help preserve the pristine first major surface 105a of the glass ribbon 103 and, in some embodiments, to help reduce damage to the cylindrical rods 111. In some embodiments, as discussed below, the first convex spherical segment 117a and the second convex spherical segment 117b can each be levitated on a fluid cushion 325 to help reduce friction during rotation of the cylindrical rod 111.

Levitation of the first and second convex spherical segment 117a, 117b on a fluid cushion 325 (e.g., gas cushion) can be achieved in a wide variety of ways. In some embodiments, the support apparatus 101, 501 can include a first area receiving a portion of the first convex spherical segment 117a and a second area receiving a portion of the second convex spherical segment 117b. The first and second areas that receive the first and second convex spherical segments 117a, 117b can be included within the support surface 119 (i.e., as an integral part of the support surface 119). Alternatively, as shown in FIG. 1, the first and second areas can be provided by first and second bases 121a, 121b that may be provided for mounting relative to the support surface 119. In such a manner, the support apparatus 101, 501 may be customized and installed on a prefabricated support surface 119. For example, as shown in FIG. 1, each first and second convex spherical segment 117a, 117b can be included with the corresponding first and second base 121a, 121b that can each be mounted to the support surface 119 at predetermined locations, depending on the particular application. The first and second base 121a, 121b can be secured to the support surface 119 via an attachment member 123. In some embodiments, the attachment member 123 can be a snap, a clasp, a screw, a bolt, a buckle, a hook-and-loop fastener, a latch, a cable tie, a strap, a pin, or a peg.

In other embodiments, as shown schematically in FIG. 2, the support apparatus may also optionally be provided with one or more joint(s) 125 configured to adjustably mount the corresponding base(s) 121a, 121b including the corresponding area 305 relative to a support surface 119 in a direction 124 of the rotation axis 113 of the cylindrical rod 111. For example, as shown, the first base 121a may be mounted relative to the support surface 119 with a joint 125 for translation of the first base 121a relative to the support surface along the direction 124 of the rotation axis 113 of the corresponding cylindrical rod 111. In addition, or alternatively, the second base 121b may be mounted relative to the support surface 119 with a joint 125 for translation of the second base 121b relative to the support surface 119 along the direction 124 of the rotation axis 113 of the corresponding cylindrical rod 111. In such embodiments, the adjustable mounting of at least one base 121a, 121b relative to the support surface 119 with the joint(s) 125 to translate along the direction 124 of the rotation axis 113 of the cylindrical rod 111 can allow for adjustment of a distance between the first base 121a and the second base 121b to compensate for a thermal expansion or contraction of the cylindrical rod 111 along the rotation axis 113 as well as other parts of the support apparatus 101 due to temperature changes during use. In some embodiments, the joint(s) 125 can comprise a slider joint, a pin-slot joint, or an air bearing.

As shown in FIG. 3, the first and second base 121a, 121b can each include a corresponding area 305, that receives a corresponding portion 311 of each of the first and second convex spherical segment 117a, 117b. As shown in FIG. 3, each of the first and second base 121a, 121b can include a corresponding lip 307 that circumscribes the area 305. As shown in FIG. 3, a protruding portion 309 of the first and second convex spherical segment 117a, 117b can protrude above the corresponding lip 307 and outside of the area 305 while the corresponding portion 311 (e.g., lower corresponding portion) of each of the first and second convex spherical segment 117a, 117b can extend below the corresponding lip 307 and within the area 305. In some embodiments, the portion of the outer convex surface 319 of the first and second convex spherical segment 117a, 117b extending below the corresponding lip can include an arc defined by an angle "A" between two vectors including the center point of the outer convex surface 319 and intersecting opposed outer peripheral points of a spherically concave recessed surface 313. Rotation of the arc defined by the angle "A" about an axis extending through the center point of the outer convex surface 319 and through a central axis of symmetry of the spherically concave recessed surface 313 can define a portion of the outer convex surface 319 that extends below the lip 307. In some embodiments, the angle "A" can be within a range from about 10° to about 180°, such as from about 20° to about 175°, from about 45° to about 170°, or from about 70° to about 165°, although other angles may be provided. In some embodiments, the angle "A" may be about 180° or less to allow the first and second convex spherical segment 117a, 117b to be lifted vertically out of the area 305.

Throughout the disclosure, a convex spherical segment is considered freely supported by the base if, during operation with the support apparatus with the cylindrical rod supporting the object while the convex spherical segments are supported by the air cushions, the convex spherical segment may be removed from the area 305 of the base 121a, 121b and away from the base 121a, 121b. In some embodiments, the convex spherical segment can be freely supported by the base in that, during operation with the support apparatus with the cylindrical rod supporting the object while the convex spherical segments are supported by the air cushions, there is no structure preventing the convex spherical segments from being lifted vertically out of the area 305 of the base 121a, 121b and vertically away from the base 121a, 121b. For example, as shown in FIG. 2, as each convex spherical segment 117a, 117b is freely supported by the corresponding base 121a, 121b, disassembly of the cylindrical rod 111 and corresponding convex spherical segments 117a, 117b may be achieved by simply lifting the cylindrical rod 111 vertically in a direction opposite gravity. As there is no structure prohibiting the convex spherical segments 117a, 117b from be lifted vertically out of the area 305, disassembly of the cylindrical rod 111 can be simplified since there are no parts to be disconnected or removed before disassembly is possible. Furthermore, as the convex spherical segment 117a, 117b is configured to be freely supported by the corresponding base 121a, 121b, installation of the cylindrical rod 111 relative to the bases 121a, 121b is simplified because a functional unit may be provided by simply dropping the convex spherical segments 117a, 117b attached to a cylindrical rod 111 into the area 305 of the corresponding base 121a, 121b without further assembly to provide the ability of the support apparatus to function as intended.

Referring to FIG. 3, the shown convex spherical segment 117a, 117b is supported by a corresponding base 121a, 121b with an angle "A" of about 180° or less, which means that the convex spherical segment 117a, 117b can be lifted vertically out of the area 305. In other embodiments, a clam-shell attachment top (e.g., cage) may be provided to allow the effective angle "A" to be about 180° or more while preventing inadvertent removal of the first and second convex spherical segment 117a, 117b from the corresponding area 305. However, some embodiments may not trap the spherical segment, (e.g., with an effective angle "A" of about 180° or less) to simplify assembly and disassembly of the support apparatus 101, 501 as well as to facilitate cleaning and/or cooling of the first and second convex spherical segments 117a, 117b and adjacent areas with the fluid stream 329 being fed into the gap 323. Furthermore, in some embodiments, a reduced angle "A" can allow clearance of the diameter 203 of the cylindrical rod 111 as well as tilting between the position shown in solid lines in FIG. 4 and the position shown in phantom lines in FIG. 4 that, in some embodiments, may be limited by interference between the cylindrical rod 111 and associated lip 307 of the base. Furthermore, the angle "A" may be selected to be large enough to prevent inadvertent jumping of the convex spherical segment 117a, 117b out of the area 305 during operation.

As shown, a recessed surface 313 of the first and second base 121a, 121b can define corresponding area 305. As shown, the area 305 of the first and second base 121a, 121b can be recessed below the lip 307 by a maximum depth 315. The maximum depth 315 of the area 305 may be defined as the vertical distance between the lip 307 and the lowermost point of the recessed surface 313 of defining the area 305. In some embodiments, the maximum depth 315 may be within a range from about 20% to about 100%, about 40% to about 90%, about 60% to about 90%, or about 80% of a radius 317 of the outer convex surface 319 of the corresponding first and second convex spherical segment 117a, 117b. The maximum depth 315 of the area 305 associated with the corresponding first and second base 121a, 121b associated with the convex spherical segments of each cylindrical rod 111 may be the same or different from one another.

As shown, the radius 317 of the outer convex surface 319 of the first convex spherical segment 117a may be identical to the radius 317 of the outer convex surface 319 of the second convex spherical segment 117b. Although not shown, in some embodiments, the radius 317 of the outer convex surface 319 of the first convex spherical segment 117a may be different than the radius 317 of the outer convex surface 319 of the second convex spherical segment 117b. For instance, as shown, in some embodiments, the first convex spherical segment 117a and corresponding first base 121a may be an identical mirror image of the second convex spherical segment 117b and the corresponding second base 121b. Although not shown, in some embodiments, the first convex spherical segment 117a and corresponding first base 121a may not be an identical mirror image of the second convex spherical segment 117b and the corresponding second base 121b. For instance, the first convex spherical segment 117a and corresponding first base 121a may be a different size (e.g., a larger or smaller size) than the second convex spherical segment 117b and corresponding second base 121b or may have other characteristics that are not the same as the characteristics of the second convex spherical segment 117b and/or corresponding second base 121b.

The recessed surface 313 defining the area 305 can comprise a wide range of shapes and sizes. For instance, in some embodiments, the recessed surface can comprise a vertical circular cylinder side surface with a flat or otherwise shaped bottom surface. In other embodiments, the recessed surface can comprise an upwardly conical or frustoconical shape. In still other embodiments, the recessed surface may comprise an upwardly concave shape such as an upwardly ellipsoidal shape. In further embodiments, as shown in FIG. 3, the recessed surface can comprise a spherically concave recessed surface 313 of a spherically concave segment with a radius 321. In some embodiments, as shown, the radius 321 of the spherically concave recessed surface 313 of the spherically concave segment can be greater than the radius 317 of the outer convex surface 319 of the corresponding first and second convex spherical segments 117a, 117b although the radius 321 can be equal to the radius 317 in further embodiments.

In embodiments where the radius 321 is greater than the radius 317, the difference in radii can define a consistent gap 323 between the spherical convex surface 319 and the spherical concave recessed surface 313 of the spherically concave segment. When a fluid stream 329 is circulated, the consistent gap 323 can allow a fluid cushion 325 with a constant thickness (e.g., the difference between the radius 321 and the radius 317) to develop and levitate the first and second convex spherical segments 117a, 117b with respect to the first and second bases 121a, 121b and prevent physical contact therebetween to minimize friction and thereby minimize resistance to rotational motion of the associated cylindrical rod 111. In some even further embodiments, the radius 317 of the outer convex surface 319 can be less than the radius 321 of the spherically concave recessed surface 313 of the spherically concave segment by about 20% or less, by about 15% or less, by about 10% or less, by about 5% or less, by about 2% or less, by about 1% or less. In further embodiments, the radius 317 of the outer convex surface 319 can be less than the radius 321 of the spherically concave recessed surface 313 of the spherically concave segment within a range from about 1% to about 20%, by from about 1% to about 15%, by from about 1% to about 10%, or by about 1% to about 5%.

The support apparatus 101, 501 can further include a fluid port 327 in fluid communication with the area 305 of each of the first and second base 121a, 121b. In some embodiments, as shown in FIG. 3, the fluid port 327 may consist of a single orifice in the bottom of the recessed surface 313 of first and second base 121a, 121b. In other embodiments, the fluid port may comprise a plurality of orifices in the recessed surface 313. In further embodiments, the plurality of orifices may be equally spaced along a cross-section of the recessed surface 313. In other further embodiments, the plurality of orifices may be distributed across a plurality of cross-sections of the recessed surface 313. In any of these further embodiments, the fluid stream 329 flowing through each orifice or a subset of the orifices may be controlled independently of the other orifices using a restrictor, a throttle, a valve, or a relay-controlled actuator. In some embodiments, the fluid port 327 may simply comprise an opening. In other embodiments, the fluid port 327 may comprise a one-way valve. In yet other embodiments, as shown in FIG. 3, the fluid port 327 may comprise a pocket compensated orifice, where a restriction portion, such as the illustrated plug 328 with a plug opening 330. As shown, in some embodiments, the plug opening 330 includes a cross-sectional area along a plane perpendicular to the flow direction that is less than the cross-sectional area of the conduit 333 along a plane perpendicular to the flow area at a position upstream and downstream from the restriction portion. Indeed, in some embodiments, as shown in FIG. 3, the plug 328 with plug opening 330 may be press-fit within the conduit 333 and recessed within the conduit 333 to a position upstream from the fluid port 327. In such embodiments, pneumatic hammer instability can be avoided because a volume of a pocket 332 of the conduit behind the restriction portion (e.g., plug 328) can be sufficient to dampen fluctuations in the fluid stream 329 caused by changes in the gap 323 or loading of the corresponding cylindrical rod 111. The fluid port 327 can comprise one or more openings, as described above, through the respective recessed surface 313 to feed a fluid stream 329 into the gap 323 to develop and maintain the fluid cushion 325 to levitate the first and second convex spherical segments 117a, 117b relative to the corresponding base 121a, 121b. In some embodiments, a fluid supply such as the illustrated pressurized hose 331 can be coupled to a conduit 333 of each corresponding base 121a, 121b to deliver the fluid stream 329 to the fluid port 327 and thereafter to the area 305.

In some embodiments, the fluid stream 329 can comprise a gas, for example, air, nitrogen, helium, argon, carbon dioxide, or a mix of the above gases. In such embodiments, the portion of the support apparatus 101 shown in FIG. 3 may be referred to as an air bearing and the fluid cushion 325 within the gap 323 may be referred to as an air cushion even if the fluid stream 329 comprises a gas other than air. In such embodiments, the fluid may be readily compressible. As such, the fluid stream 329 can naturally cool structures associated with the gap 323 because a compressed gas from a fluid supply will expand as it is passed through the fluid port 327 and gap 323 proportional to the pressure change of the gas, as predicted by Boyle's law and the ideal gas law. In other embodiments, the fluid stream 329 can comprise a vapor, for example steam, or a supercritical fluid, for example supercritical carbon dioxide. In yet other embodiments, the fluid stream 329 can comprise a liquid, for example water. In some embodiments, the fluid supply can comprise a pump, a canister, a cartridge, a boiler, a compressor, and/or a pressure vessel.

The fluid stream 329 circulated through the gap 323 can provide at least one of several technical benefits in addition to feeding and maintaining the fluid cushion 325. For example, circulation of the fluid stream 329 may convectively cool the surfaces 319, 313 defining to the gap 323. Also, circulation of fluid stream 329 may perform a self-cleaning function that removes and/or prevents accumulation of undesired debris or other particles from the outer convex surface 319 and in the vicinity of the gap 323. In embodiments where the fluid stream 329 is compressible, the compressible fluid stream may, upon expansion, cool or provide temperature control to the surfaces 319, 313 defining the gap 323, as discussed above. Additionally, the compressible fluid stream may help to isolate the object (e.g., glass ribbon 103) being supported from environmental vibrations. In embodiments where the fluid stream 329 has a low viscosity, there may be low friction and low heat generation upon rotation of the convex spherical segment 117a, 117b being supported by the fluid cushion 325. For example, gas streams can comprise a dynamic viscosity of about $2 \times 10^{-5}$ Pa s or less while water has a dynamic viscosity about 0.001 Pa s. In such embodiments, a low viscosity may be about $10^{-3}$ Pa s or less, about $10^{-4}$ Pa s or less, or about $2 \times 10^{-5}$ Pa s or less. Low frictional forces for rotation of the convex spherical segment 117a levitated on the fluid cushion 325 can reduce resistance to movement of the object (e.g, glass ribbon 103) being supported, which will help reduce the incidence of sliding friction between the surface (e.g., first major surface 105a) of the object (e.g., glass ribbon 103) and the outer peripheral surface 201 of the cylindrical rod 111.

Embodiments of methods of assembling the support apparatus 101, 501 will now be described. As shown in FIG. 1, in one embodiment, the first and second bases 121a, 121b may be fastened with respect to the support surface 119. For example, in some embodiments, all of the first bases 121a may be aligned with respect to one another along a linear path and then attached to the support surface 119 with the attachment member 123 (e.g., a self-tapping screw or other fastener). Next, a first convex spherical segment 117a may be inserted into the area 305 of each corresponding first base 121a. Next, the second bases may be positioned in alignment with one another and with the corresponding second convex spherical segment 117b positioned within the area 305 of each corresponding second base 121b. As such, proper distancing between the corresponding pairs of bases 121a, 121b can be achieved since the first and second convex spherical segments 117a, 117b associated with the cylindrical rod 111 of the corresponding pair of bases 121a, 121b are already properly seated within the corresponding area 305. Once the bases 121a, 121b are spaced with the first and second convex spherical segments 117a, 117b properly seated within the corresponding area 305, the second bases 121b may be fastened to the support surface 119 with the attachment member 123.

Furthermore, the geometry of the convex spherical segments 117a, 117b can tolerate a misalignment of one or more rotation axis 113 with respect to another rotation axis 113 without significantly impacting performance of the support apparatus 101, 501. For example, although a parallel alignment of the rotation axis 113 of each cylindrical rod 111 may be achieved in some embodiments, during installation, misalignment may nonetheless occur due to installation error or due to the characteristics of the support surface 119. As such, a nonparallel arrangement between the rotation axis 113 of one or more cylindrical rods 111 may ultimately occur as shown in FIGS. 4-5. However, even with a misalignment, conveyance may still occur along the travel direction 109. For instance, a slight misalignment may not significantly impact a rigid object (e.g., a rigid glass ribbon 103). Furthermore, even significant misalignments may allow conveyance of a flexible object (e.g., flexible glass ribbon 103) as the flexible ribbon would merely flex along any nonplanar conveyance path defined by the cylindrical rods 111. Indeed, the rotation of the cylindrical rods 111 in the direction out the page in FIG. 4 (i.e., in the x-y plane) is not impeded by the receiving portions when the lip 307 is lower than the cylindrical rod 111 when a fluid stream 329 creates an air cushion supporting the first and second convex spherical segments 117a, 117b of the cylindrical rod. Additionally, rotation of the cylindrical rod is not impeded by the receiving portion or lip 307 for slight or even moderate misalignments in the "z" direction as long as angle formed by a line connecting a first point at the center of the convex spherical segment 117a, 117b and a second point on the lip 307 furthest from the first point is greater than the vertical misalignment between the convex spherical end portions of the cylindrical rod 111. Thus, the convex spherical segments 117a, 117b can simplify and reduce the expense of installing the support apparatus 101, 501, can allow installation of a support apparatus 101, 501 on irregular support surfaces 119 and can help reduce frictional resistance to rotation of the cylindrical rods 111 during conveyance of the object (e.g., glass ribbon 103).

In some embodiments, the cylindrical rod 111 can be pivotably adjusted about a first pivot axis of the first convex spherical segment 117a and/or the second convex spherical segment 117b that can be perpendicular to the first rotation axis 113 of the first cylindrical rod 111. In further embodiments, the first pivot axis may be in the "z" direction, as indicated by reference numbers 118a, 118b in FIGS. 1-2 and 4-5. In some embodiments, the cylindrical rod 111 can be pivoted by an adjustment angle of about 10° to about 30°, and in some embodiments by an adjustment angle of about 10° to about 360°, about the first pivot axis (e.g., 118a, 118b) of the corresponding convex spherical segment 117a, 117b. In even further embodiments, the cylindrical rod 111 can be pivotably adjusted about a second pivot axis of the first convex spherical segment 117a and/or the second convex spherical segment 117b that can be perpendicular to both the first rotation axis 113 of the cylindrical rod 111 and the first pivot axis (e.g., 118a, 118b). In such embodiments, the first pivot axis may be in the "x" direction, as indicated by reference numbers 120a, 120b in FIGS. 1-2 and 4-5. In some embodiments, the cylindrical rod 111 can be pivoted by an adjustment angle of about 10° to about 30° about the second pivot axis (e.g., 120a, 120b) before further pivoting is prevented by engagement between the cylindrical rod 111 and the base 121a, 121b. For instance, as shown in FIG. 4, the cylindrical rod 111 can be pivoted about the second pivot axis (e.g., 120a) of the first convex spherical segment 117a by an adjustment angle of about 10° to about 30° before the interaction between the cylindrical rod 111 and the lip 307 of the base 121b prevents further pivoting due to the contact therebetween as shown in dashed lines in FIG. 4.

In other embodiments, the first pivot axis may be in the "x" direction, as indicated by reference number 120a in FIGS. 1-2 and 4-5. In some embodiments, the first cylindrical rod 111 can be pivoted by an adjustment angle of about 10° to about 30° about the first pivot axis (e.g., 120a, 120b) of the first convex spherical segment 117a and/or the second convex spherical segment 117b. In some embodiments, the cylindrical rod 111 can be pivoted by an adjustment angle of about 10° to about 30° about the first pivot axis (e.g., 120a, 120b) before further pivoting is prevented by engagement between the cylindrical rod 111 and the base 121a, 121b. For instance, as shown again in FIG. 4, the cylindrical rod 111 can be pivoted about the first pivot axis (e.g., 120a) of the first convex spherical segment 117a by an adjustment angle of about 10° to about 30° before the interaction between the cylindrical rod 111 and the lip 307 of the base 121b prevents further pivoting due to the contact therebetween as shown in dashed lines in FIG. 4.

Some embodiments involve methods of supporting an object (e.g., glass ribbon 103) with the support apparatus 101, 501 discussed above. In some embodiments, the fluid stream 329 can be passed from a pressurized hose 331 through the conduit 333 and through the fluid port 327 into the area 305 of each corresponding base 121a, 121b to levitate the first and second convex spherical segment 117a, 117b on respective fluid cushions 325. In some embodiments, the fluid stream 329 can comprise an air stream wherein the fluid cushions 325 comprise air cushions. In such embodiments, an object (e.g. glass ribbon 103) can be supported by such the support apparatus 101, 501 by engaging the first major surface 105a of the object with the outer peripheral surface 201 of the cylindrical rod 111 so that the cylindrical rod 111 supports a weight of the object (e.g., a weight of the glass ribbon 103). In further embodiments, the cylindrical rod 111 may rotate together with the associated first and second convex spherical segments 117a, 117b as the object (e.g., glass ribbon 103) translates along the travel direction 109 and while the first and second convex spherical segments 117a, 117b are each levitated on respective fluid cushions 325. In further embodiments, the first and second convex spherical segments 117a, 117b can be freely supported by the area 305 of the corresponding base 121a, 121b while the first cylindrical rod 111 is supporting an object (e.g., glass ribbon 103) and the first and second convex spherical segments 117a, 117b are each levitated on respective fluid cushions. In other fluid embodiments, the first base 121a may be translated in the direction of the first rotation axis 113 of the first cylindrical rod 111 relative to a support surface 119 (e.g., by way of using the joint 125) to adjust the distance between the first base 121a and the second base 121b while the first cylindrical rod 111 is supporting an object (e.g., glass ribbon 103) in order to compensate for thermal expansion or contraction of the first cylindrical rod 111.

Various objects may be supported by the support apparatus 101, 501 of the present disclosure. In some embodiments, as discussed above, the objects may comprise a glass ribbon 103 such as a glass sheet. Glass sheets are commonly used, for example, in display applications, for example liquid crystal displays (LCDs), electrophoretic displays (EPD), organic light emitting diode displays (OLEDs), plasma display panels (PDPs), or the like. Glass sheets are commonly fabricated by a flowing molten glass to a forming body whereby a glass ribbon 103 may be formed by a variety of ribbon forming processes, for example, slot draw, float, down-draw, fusion down-draw, rolling, tube drawing, or up-draw. Edge portions of the glass ribbon 103 may be separated from a central portion of the glass ribbon 103 and/or the glass ribbon 103 may be periodically separated into individual glass sheets. The glass ribbon 103 may be supported with the support apparatus 101, 501 prior to separating the central portion of the glass ribbon 103, prior to separating a glass sheet from the glass ribbon 103, or after separating the glass sheet from the glass ribbon 103.

In some embodiments, the support apparatus 101, 501 can support the glass ribbon 103 shortly after being formed prior to separation and/or after separation into a portion of glass ribbon 103 comprising a glass sheet. The support apparatus 101, 501 can support the glass ribbon 103 to avoid introducing excess tension or slack into the glass ribbon before it has cooled sufficiently to hold its shape. Typically, the glass will be sufficiently cooled by the time it reaches the strain point, which is commonly defined as the temperature at which the viscosity of the glass ribbon 103 exceeds $10^{14.5}$ Poise. Support with the support apparatus 101, 501 provides direct physical contact between the outer peripheral surface 201 of the cylindrical rods 111 and therefore does not require an air cushion to directly impact the glass ribbon 103. Therefore, the direct contact provided by the cylindrical rods 111 can avoid use of air cushions to directly contact the glass ribbon 103 that may undesirably cool the glass ribbon 103 too quickly, in some embodiments. Furthermore, maintenance of the pristine surfaces of the major surfaces 105a, 105b of the glass ribbon 103 can be maintained, despite being physically contacted by the outer peripheral surface 201 of the cylindrical rods 111, due to the reduced frictional resistance to rotation provided by the levitation of the first and second convex spherical segments 117a, 117b on the respective fluid cushions 325.

The methods of supporting an object can be used for various applications. In some applications, the object supported may be a glass ribbon, a cut glass sheet, a silicon wafer, a plastic film, or a sheet of other material. In further applications, the object supported may be moved continuously or intermittently to convey the object.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

As used herein, the terms "comprising" and "including, and variations thereof, shall be construed as synonymous and open-ended, unless otherwise indicated.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What it claimed is:

1. A support apparatus comprising:
   a first cylindrical rod comprising a first end portion and a second end portion, wherein the first cylindrical rod extends along a first rotation axis from the first end portion to the second end portion of the first cylindrical rod, and wherein the first end portion is provided with a first convex spherical segment and the second end portion is provided with a second convex spherical segment;
   a first area configured to receive a portion of the first convex spherical segment with the first cylindrical rod pivotable about a first pivot axis of the first convex spherical segment that is perpendicular to the first rotation axis of the cylindrical rod;
   a first fluid port in fluid communication with the first area;
   a second area configured to receive a portion of the second convex spherical segment with the first cylindrical rod pivotable about a first pivot axis of the second convex spherical segment that is perpendicular to the first rotation axis of the cylindrical rod and parallel to the first pivot axis of the first convex spherical segment; and
   a second fluid port in fluid communication with the second area.

2. The support apparatus of claim 1, wherein the first area is configured to receive the portion of the first convex spherical segment with the first cylindrical rod pivotable about a second pivot axis of the first convex spherical segment that is perpendicular to the first rotation axis of the cylindrical rod and to the first pivot axis of the first convex spherical segment, and the second area is configured to receive the portion of the second convex spherical segment with the first cylindrical rod pivotable about a second pivot axis of the second convex spherical segment that is parallel to the second pivot axis of the first convex spherical segment and perpendicular to the first rotation axis of the cylindrical rod and to the first pivot axis of the second convex spherical segment.

3. The support apparatus of claim 2, wherein the first area is configured to receive the portion of the first convex spherical segment with the first cylindrical rod pivotable by from about 10° to about 30° about the second pivot axis of the first convex spherical segment, and the second area is configured to receive the portion of the second convex spherical segment with the first cylindrical rod pivotable by from about 10° to about 30° about the second pivot axis of the second convex spherical segment.

4. The support apparatus of claim 1, wherein the first spherical segment is configured to be freely supported by the first area and the second spherical segment is configured to be freely supported by the second area.

5. The support apparatus of claim 1, wherein the first area is configured to receive the portion of the first convex spherical segment with the first cylindrical rod pivotable by from about 10° to about 30° about the first pivot axis of the first convex spherical segment, and the second area is configured to receive the portion of the second convex spherical segment with the first cylindrical rod pivotable by from about 10° to about 30° about the first pivot axis of the second convex spherical segment.

6. The support apparatus of claim 5, wherein the first area is configured to receive the portion of the first convex spherical segment with the first cylindrical rod pivotable by 360° about the first pivot axis of the first convex spherical segment, and the second area is configured to receive the portion of the second convex spherical segment with the first cylindrical rod pivotable by 360° about the first pivot axis of the second convex spherical segment.

7. The support apparatus of claim 1, further comprising a joint configured to adjustably mount the first area relative to a support surface in a direction of the first rotation axis of the first cylindrical rod.

8. The support apparatus of claim 1, wherein a first lip circumscribes the first area and a second lip circumscribes the second area.

9. The support apparatus of claim 8, wherein the first area is recessed below the first lip at a maximum depth of from about 20% to about 80% of a first radius of the first convex spherical segment and the second area is recessed below the second lip at a maximum depth of from about 20% to about 80% of a second radius of the second convex spherical segment.

10. The support apparatus of claim 1, wherein the first cylindrical rod comprises one or a combination of materials selected from the group consisting of: alumina, fused quartz, mullite, silicon carbide, and graphite.

11. The support apparatus of claim 1, wherein the first area is defined by a first concave segment.

12. The support apparatus of claim 11, wherein the first concave segment comprises a first concave spherical segment.

13. The support apparatus of claim 1, wherein the second area is defined by a second concave segment.

14. The support apparatus of claim 13, wherein the second concave segment comprises a second concave spherical segment.

15. The support apparatus of claim 1, further comprising a second cylindrical rod.

16. The support apparatus of claim 15, wherein the first rotation axis of the first cylindrical rod is parallel to a second rotation axis of the second cylindrical rod.

17. The support apparatus of claim 15, wherein a first rotation axis of the first cylindrical rod extends at an acute angle relative to a second rotation axis of the second cylindrical rod.

18. The support apparatus of claim 17, wherein the first rotation axis and the second rotation axis do not extend along a common plane.

19. The support apparatus of claim 16, wherein the first rotation axis and the second rotation axis extend along a common plane.

20. A method of supporting an object with the support apparatus of claim 1, the method comprising:
passing a first fluid stream through the first fluid port to form a first fluid cushion that levitates the first convex spherical segment;
passing a second fluid stream through the second fluid port to form a second fluid cushion that levitates the second convex spherical segment; and
engaging a surface of the object with an outer surface of the first cylindrical rod, wherein the first cylindrical rod supports a weight of the object while the first cylindrical rod is supported by the first fluid cushion and the second fluid cushion.

21. The method of supporting an object of claim 20, further comprising traversing the object along a travel direction, wherein the object drives the first cylindrical rod to rotate about the first rotation axis while the first cylindrical rod is supported by the first fluid cushion and the second fluid cushion.

22. The method of supporting an object of claim 20, wherein the object comprises a glass ribbon.

23. The method supporting an object of claim 20, wherein the object comprises a temperature within a range from about 500° C. to about 1200° C.

24. The method of supporting an object of claim 20, wherein the first spherical segment is freely supported by the first area and the second spherical segment is freely supported by the second area while supporting the object.

25. The method of supporting an object of claim 20, further comprising adjusting a distance between the first area and the second area while supporting the object.

* * * * *

UNITED STATES PATENT AND TRADEMARK OFFICE
CERTIFICATE OF CORRECTION

| | | |
|---|---|---|
| PATENT NO. | : 11,565,883 B2 | |
| APPLICATION NO. | : 17/271389 | |
| DATED | : January 31, 2023 | |
| INVENTOR(S) | : Jared David Beckwith et al. | |

It is certified that error appears in the above-identified patent and that said Letters Patent is hereby corrected as shown below:

In the Claims

In Column 20, Line 14, in Claim 23, after "method" insert -- of --.

Signed and Sealed this
Sixteenth Day of May, 2023

Katherine Kelly Vidal
*Director of the United States Patent and Trademark Office*